A. EPPLER.
SHOE SEWING MACHINE.
APPLICATION FILED FEB. 24, 1905.

1,092,567.

Patented Apr. 7, 1914.

5 SHEETS—SHEET 2.

Witnesses
Farnum F. Dorsey
Alfred H. Hildreth

Inventor
Andrew Eppler
by his Attorneys
Phillips Van Everen Fish

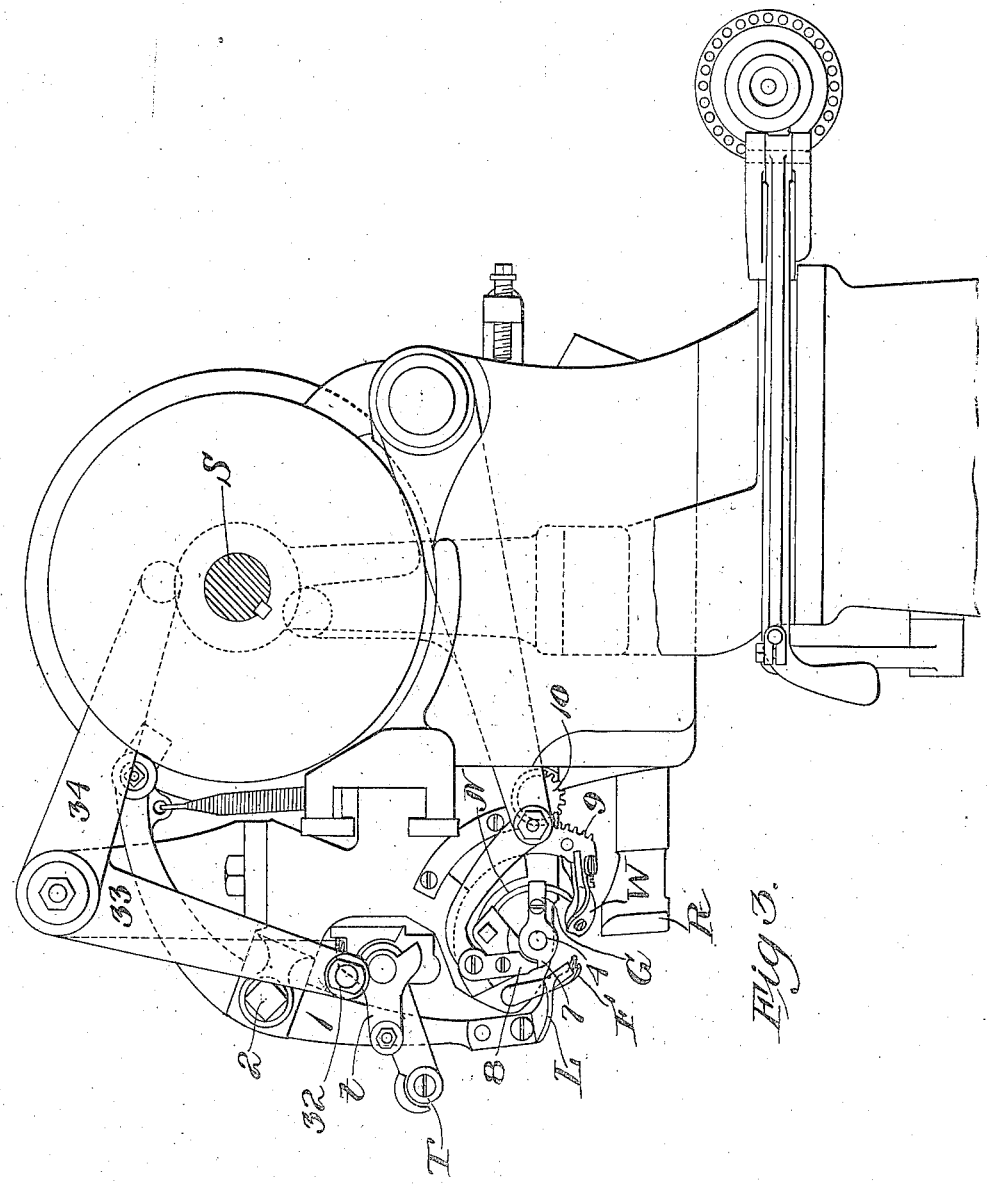

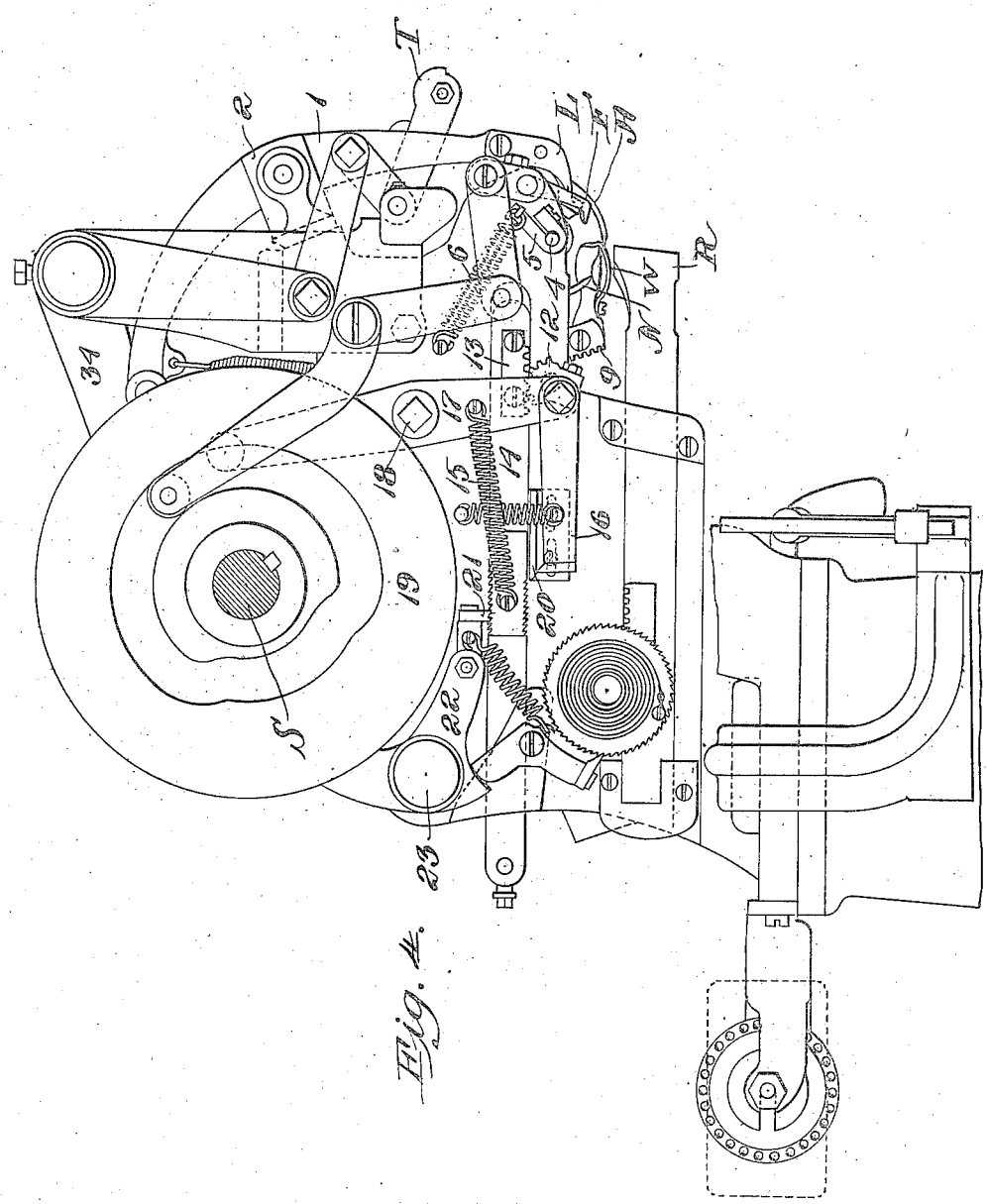

A. EPPLER.
SHOE SEWING MACHINE.
APPLICATION FILED FEB. 24, 1905.
1,092,567.
Patented Apr. 7, 1914.
5 SHEETS—SHEET 5.
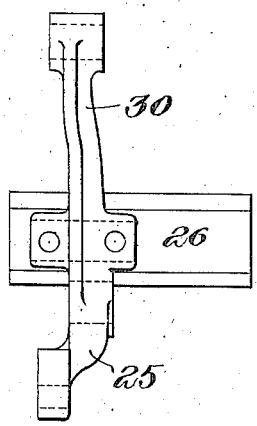
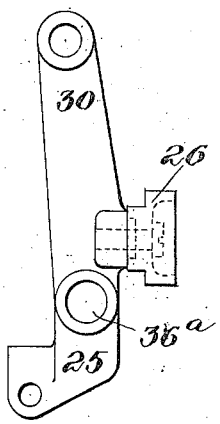
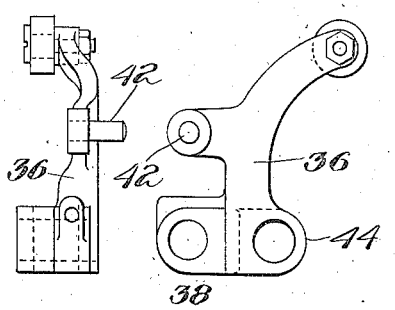
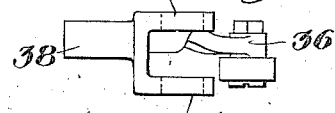
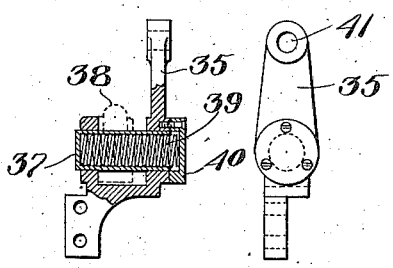
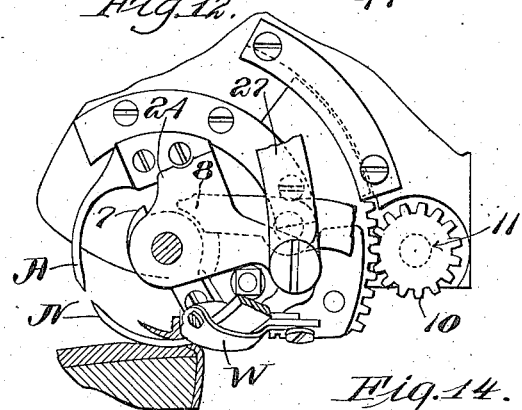
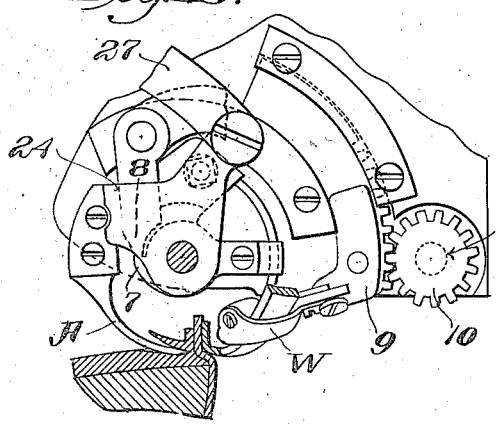
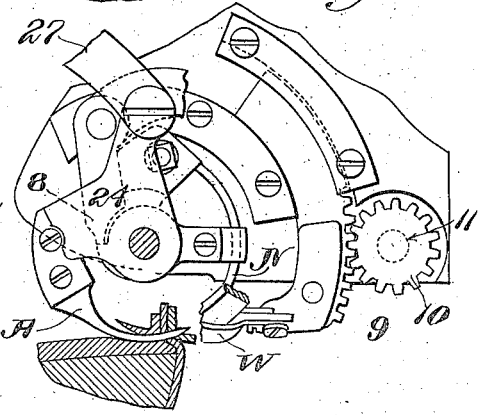
Witnesses
Barnum F. Dorsey
Alfred H. Hildreth
Inventor
Andrew Eppler
by his Attorneys
Phillips Van Curen & Fish

UNITED STATES PATENT OFFICE.

ANDREW EPPLER, OF BOSTON, MASSACHUSETTS, ASSIGNOR TO UNITED SHOE MACHINERY COMPANY, OF PATERSON, NEW JERSEY, A CORPORATION OF NEW JERSEY.

SHOE-SEWING MACHINE.

1,092,567.  Specification of Letters Patent.  Patented Apr. 7, 1914.

Application filed February 24, 1905. Serial No. 247,117.

*To all whom it may concern:*

Be it known that I, ANDREW EPPLER, a citizen of the United States, residing at Boston, in the county of Suffolk and State of Massachusetts, have invented certain new and useful Improvements in Shoe-Sewing Machines; and I do hereby declare the following to be a full, clear, and exact description of the invention, such as will enable others skilled in the art to which it appertains to make and use the same.

The present invention relates to an improvement in shoe sewing machines, and more particularly sewing machines of the curved hook needle chain stitch type, of which the welt and turn machines are examples.

The object of the present invention is to re-organize the construction of shoe sewing machines of this type in order to improve their construction and modes of operation.

To the above ends the present invention consists in the devices and combination of devices hereinafter described and particularly defined in the claims.

The accompanying drawings illustrate an embodiment of the invention in the modification of the well-known Goodyear, welt and turn machines.

Figure 1:
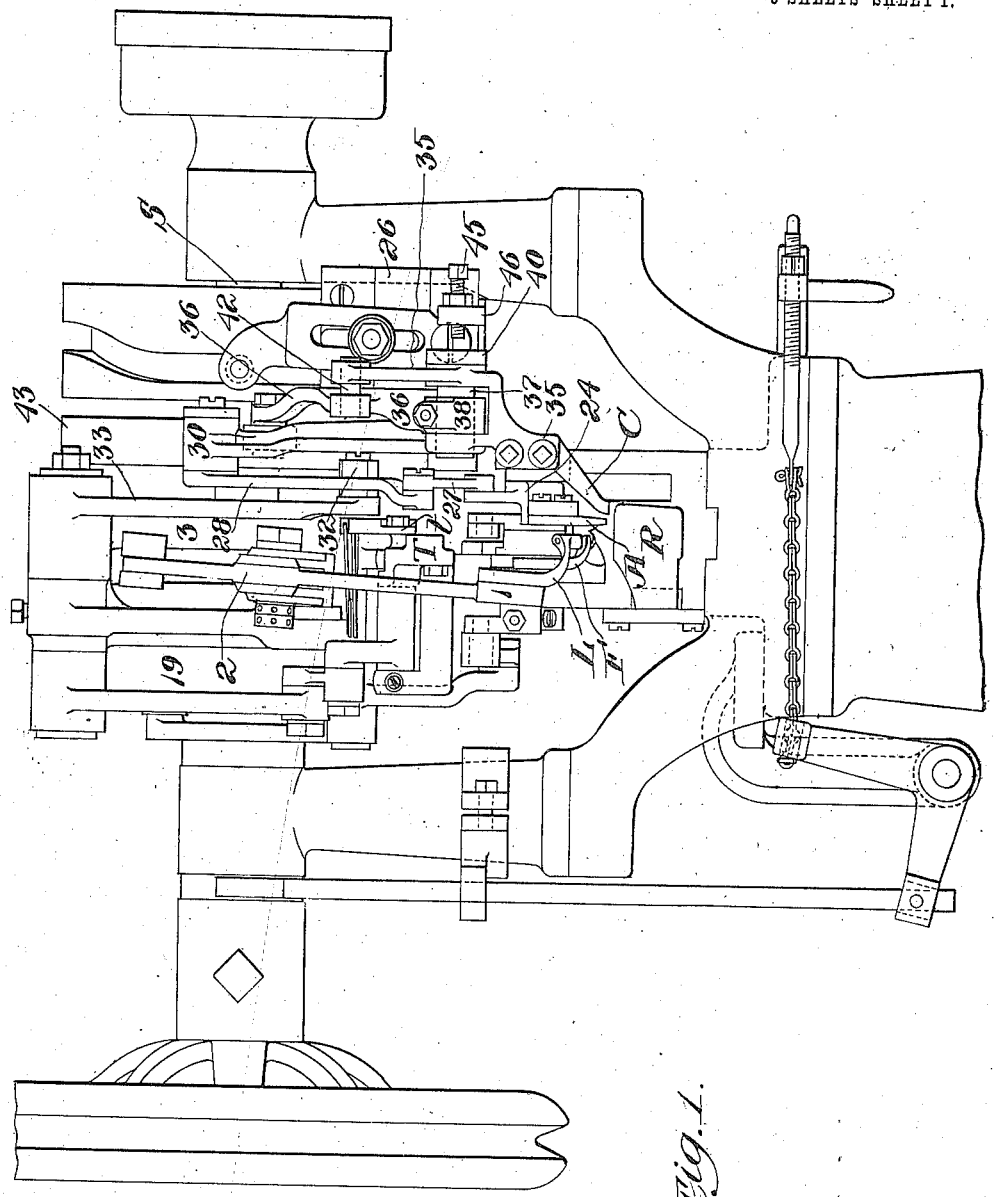
Figure 2:
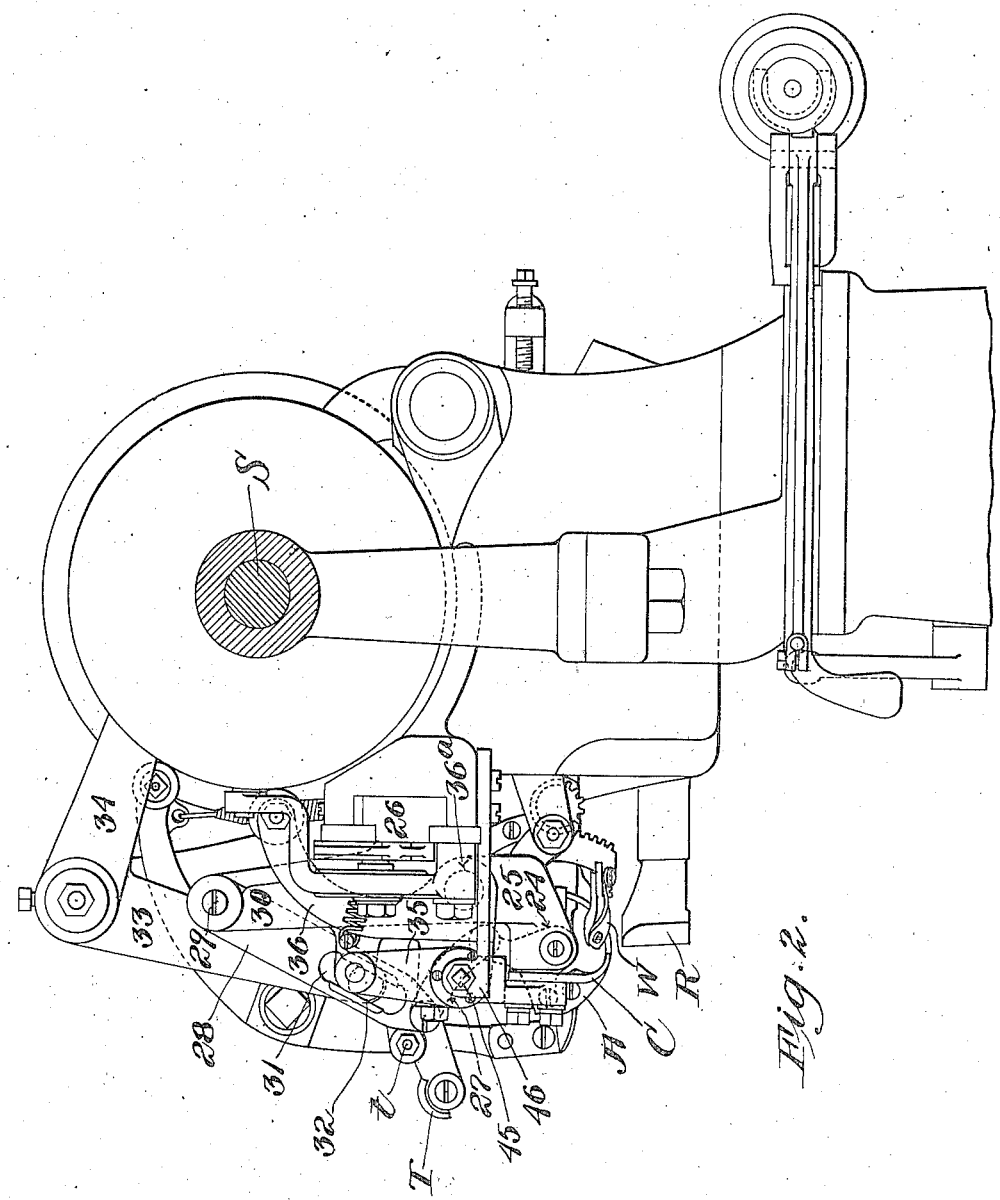

Figure 1 is a front elevation of the machine, Fig. 2 is a right side elevation, the connector being broken away by a section plane, Fig. 3 is a similar side elevation with parts removed in order to show with greater clearness parts hidden in Fig. 2, Fig. 4 is a left side elevation, the bearing for the main shaft being broken away, Fig. 5 is a front elevation, and Fig. 6 is a side elevation of the feet slide and awl support, Fig. 7 is a front elevation, Fig. 8 is a right side elevation, and Fig. 9 is a bottom plan of the upper portion of the channel guide lever, Fig. 10 is a sectional front elevation, and Fig. 11 is a right side elevation of the lower portion of the channel guide lever, and Figs. 12, 13 and 14 are similar side elevations showing the needle awl welt guide and associated parts in different positions, Fig. 12 in the position which the parts assume when the needle stands in its forward position through the materials, Fig. 13 the position of the parts when the awl is in engagement with the work preparatory to the lateral feeding movement thereto, and Fig. 14 shows the awl after the feeding movement is completed and after it has moved forward and penetrated the materials.

As above suggested the present embodiment of the invention is illustrated as a modification of the Goodyear welt and turn machines, and, therefore, except where otherwise stated the parts of the machine not herein specifically referred to are or may be constructed substantially as in said machine, and for description thereof reference may be had to the patent to French and Meyer, No. 412,704.

The needle N is the usual curved hook needle and it is carried by the usual needle segment and is arranged and operated in the usual manner.

The looper L is carried upon the lower end of the looper lever $l$, which is pivotally supported upon the swivel 2, in turn pivotally mounted upon a stationary part of the frame of the machine. Upon the upper end of the looper lever are carried three cam rolls which engage cam paths on the cam disk 3 mounted on the main shaft S of the machine.

The above described arrangement is such that the looper starting from its position at the left in the rear of the thread finger moves first to the right then down around the needle and up over it to lay the thread in the hook of the needle and then downwardly in a diagonal direction to the left to a position substantially in line with the needle hole, then after the needle has withdrawn through the materials it moves straight up and then to the left to its original position. This motion of the looper requires a second dip in the cam after the first dip which causes the looper to move downward in the needle encircling movement.

The thread finger F is actuated to make slightly longer movement than the thread finger of the Goodyear machine so that it has slightly greater thread taking capacity but it is supported and actuated in the same manner as in said machine.

The needle guide G is mounted upon the stud 4 which extends through a longitudinal hole provided for it in the needle shaft and upon its opposite end it carries an arm 5 to the end of which is attached one end of the spring 6 having its other end attached to a stationary part of the machine. This construction affords a more convenient method of applying the spring to the needle guide, but it actuates the needle guide in the same manner as it was actuated in the said Goodyear machine, namely, to move the guide yieldingly toward the work with the advancing movement of the needle. The needle guide is provided with a shoulder 7 which is adapted to be engaged by a lug 8 secured to the needle segment. When the needle is retracted the lug 8 engages the shoulder 7 of the needle guide and positively retracts the needle guide. The lug 8 does not engage the shoulder 7 until after the first part of the retracting movement of the needle is completed (see Fig. 12).

The take-up T and auxiliary take-up t are constructed substantially as in said patented machine but the cam which operates the take-up is so shaped that it rises during the forward movement of the needle to take up the slack in the loop standing around the shank of the needle operating thereby to tighten and set the stitch, then it falls in three stages, first, rapidly, to give up thread to the thread finger and auxiliary take-up, which auxiliary take-up falls to its limit and rests against its stop at the completion of this movement of the take-up, then the take-up moves slowly downward a short distance during the looping movement of the looper thereby giving up thread to the looper, and then it moves rapidly downward for the remainder of its stroke, giving up thread to the needle on the one side thereof while the thread finger gives thread to it on the other side. Since the auxiliary takeup falls to its limit and rests against its stop before the needle begins its loop drawing stroke, the auxiliary takeup has no thread drawing capacity while the takeup and thread arm are giving up thread to the needle, and consequently the auxiliary takeup is prevented from stealing thread from the thread finger. The tendency of the auxiliary takeup to steal thread from the thread finger has been an objectionable feature of chain stitch inseam sewing machines as heretofore constructed the loop of thread drawn out by the thread finger being often shortened by the action of the auxiliary takeup to such an extent as to cause an objectionable reaving of the thread through the hook of the needle. By timing the takeup and auxiliary takeup so that the auxiliary takeup falls to its limit before the thread arm begins to give up thread to the needle, all liability of an objectionable shortening of the loop of thread drawn out by the thread finger is effectually overcome.

The back rest R is constructed substantially as in said patented machine.

The welt guide W, or in case of the turn sewing machine the corresponding back gage, is of the usual construction, but it is not supported and guided in the usual manner. The welt guide is supported upon the lower end of a welt guide segment 9, which is received in a guide outside of the needle segment guide. The guide is concentric with the needle axis. The movements of the welt guide are therefore in the path of movement of the needle, or more correctly speaking perhaps, the movements of the welt guide are concentric with the axis of the needle. The welt guide segment 9 is provided upon its exterior surface with segmental gear teeth, which are engaged by the pinion 10 which is in turn carried by the pinion shaft 11 mounted in a bearing in the head of the machine which shaft 11 upon its opposite end carries the segmental pinion 12 in turn engaging the rack 13 carried by the welt guide slide 14. The welt guide slide 14 is moved forward by the spring 15 and retracted by a cam mechanism consisting of the pawl 16 carried by the welt guide lever 17 pivoted at 18 to a stationary part of the machine and carrying upon its other end a cam roll engaging a cam path in the cam disk 19 mounted upon the main shaft S of the machine. An adjustable cover plate 20 secured to the head determines the retractive stroke of the welt guide slide which, it will be observed, is uniform in length for any position of the cover plate. The pawl 16 as is clearly shown in Fig. 4 is arranged to engage ratchet teeth on the side 14, and the cover plate 20 is arranged to hold the pawl out of engagement with the teeth during a portion of its stroke. By adjusting the plate 20 longitudinally with relation to the pawl 16, the length of the operative stroke of the pawl is increased or diminished and a corresponding change made in the retractive stroke of the welt guide slide. Locking pawls 21 carried by a locking lever 22 pivoted at 23 to the frame of the machine and carrying upon its upper end a cam roll engaging a cam path in the cam disk 3 afford means for locking the welt guide slide in its forward position.

The above described arrangement and the shape of the cam paths are such that during the work feeding movement of the awl the welt guide slide is retracted from the work to release the work and again moved forward at the completion of the work feeding movement so that it engages and supports the work during the puncturing movement of the awl, the pawl 21 by the means described engaging the rack of the welt guide slide to hold the welt guide stationary during this puncturing movement. It is to be observed that the welt guide moves bodily in the curved path of the needle and not, as in the Fowler and Warren Patent No. 560,705, in a manner which changes the angle of the welt guide to the needle during its retracting and advancing strokes. By this means the welt guide always maintains its position with relation to the needle path irrespective of its movements.

The awl A is a circularly curved work feeding and puncturing instrument. It is pivotally mounted upon the feed slide, and is adapted to be oscillated about the axis of the needle. It has two movements, an oscillatory to engage and puncture the materials, and a lateral movement to feed the work. Specifically considered the awl is mounted upon the awl segment 24 pivotally mounted upon the downwardly hanging end of the awl carrier 25 which is secured to the feed slide 26. The link 27 is attached at its one end to the awl segment 24 and at the other end to the intermediate awl lever 28, which in turn is pivoted at 29 upon the upwardly extending intermediate awl lever support 30. The intermediate awl lever 28 is slotted at 31 and receives in said slot a slide block 32, which is pivotally attached to the downwardly extending arm 33 of a bell crank lever the rearwardly extending arm 34 of which carries a cam roll which engages a cam path in the cam disk 3 on the main shaft S of the machine. The slide block 32 is made long enough so that the reciprocations of the feed slide do not disengage the said slide block from the slot 31 in the intermediate awl lever 28. The means described operate to oscillate the awl. The shape of the cam path will be referred to in the description of the motions of the awl. The lateral movements of the awl are secured by the reciprocations of the feed slide 26, which is actuated in the usual manner.

The above described arrangement and the shape of the cam paths which guide the awl to make it oscillatory and its lateral movements are such that at the end of the back feed the awl moves downward and toward the left in the direction of the feed and toward and into engagement with the work, puncturing the between substance slightly beyond the bottom of the channel. The awl then moves to the left feeding the work for the length of the stitch, whereupon it moves down through the materials penetrating the between substance, upper and welt. It then rises as the needle advances, and after the needle has engaged the materials the back feed begins. Owing to the fact that the awl point moves about the axis of the needle, and because the awl segment is pivoted so low, it is necessary that the back feed movement of the awl be somewhat greater than the corresponding movement of the awl in a Goodyear machine in order to allow clearance for the looper movement.

In a turn sewing machine, in which the welt guide is not employed, the back gage comprises the work-support and would be mounted upon the welt guide segment.

The channel guide C is secured in the usual manner to the channel guide lever 35. The reciprocations of the channel guide should be as limited in extent as possible in order to facilitate sewing around sharp curves, as at the toe and shank of the shoe. The channel guide lever 35 is therefore slidingly mounted upon the auxiliary channel guide lever 36, in turn pivotally mounted at 36ª upon the awl carrier 25. A hollow stud 37 is secured to the boss 38 of the auxiliary channel guide lever 36 and the channel guide lever 35 is mounted thereon so that the auxiliary channel guide lever 36 may have a greater amplitude of reciprocations than the channel guide lever 35. A spring 39 is received within the hollow stud 37 and bears against the cap 40 of the channel guide lever 35, thereby normally tending to hold the channel guide lever in the position illustrated in Figs. 1 and 10. The upper end of the channel guide lever 35 is provided with a hole 41 which receives the pin 42 projecting laterally from the side of the auxiliary channel guide lever 36 so that the lateral movements of the auxiliary channel guide lever do not require corresponding lateral movements of the channel guide lever 36. The auxiliary channel guide lever 36 carries upon its upper end a cam roll which engages a cam surface on the cam disk 43 mounted upon the main shaft S of the machine. The auxiliary channel guide lever 36 is provided with ears 44 which embrace the downwardly extended portion of the awl carrier 25 and holes in these ears receive a pin by which the lever is pivoted to the carrier. An adjustable stop 45 screwed into the bracket 46 projected forwardly from the under side of the feed slide guide way is adapted to engage the cap 40 of the channel guide lever 35 during the back feed of the feed slide 26 so as thereby to limit the back feed movement of the channel guide without limiting the back feed movement of the feed slide 26. By adjustment of the stop 45, which is provided with a lock nut to secure it in adjusted position, the limit of the back feed movement of the channel guide may be varied.

The above described construction and the shape of the cam surface are such that after the needle has advanced and engaged the materials the channel guide C moves back slightly from the bottom of the channel and then begins its back feed movement, at the end of which it again moves forward into the bottom of the channel and engages and supports the work. The channel guide remains in engagement with the work during advancing movement of the awl, during the feed movement of the awl, and during the work puncturing movement of the awl and the retracting movement of the awl.

The present invention may be embodied in other forms of sewing machines within the scope of the following claims.

I claim—

1. A shoe sewing machine, having, in combination, a curved hook needle, a looper, a thread finger, a take-up, a spring-actuated auxiliary take-up, a relatively fixed stop for limiting the thread pulling action of the auxiliary take-up, and means for actuating the parts, all timed and arranged to prevent the auxiliary take-up from stealing thread from the thread finger during its thread delivering stroke, substantially as described.

2. A shoe sewing machine, having, in combination, a curved hook needle, a looper, an awl, a reciprocating feed slide to which the awl-carrier is pivoted, a channel guide pivotally mounted upon the feed slide, means for limiting the lateral movements of the channel guide with respect to the feed slide, and means for actuating the parts, substantially as described.

3. A shoe sewing machine, having, in combination, a curved hook needle, a looper, an awl, a channel guide, a feed slide and means for actuating the parts to cause the awl to engage, feed and penetrate the between-substances and to impart lateral reciprocations to the channel guide less in extent than those imparted to the awl, substantially as described.

4. A shoe sewing machine, having, in combination, a curved hook needle, a looper, a curved awl of the same radius of curvature as the needle, a channel guide, a feed slide, said awl and channel guide being pivotally mounted upon the feed slide, and means for actuating the parts in the proper time relation to each other and to cause the lateral reciprocations of the awl to exceed those of the channel guide, substantially as described.

5. A shoe sewing machine, having, in combination, a curved hook needle, a looper, a curved awl of the same radius of curvature as the needle, a reciprocating feed slide upon which the awl is pivotally supported upon the axis of the needle, the movements of the awl and feed slide operating to cause the awl to move diagonally down toward and into engagement with the work, to move the awl laterally the stitch length to retract the awl and to move it laterally in the opposite direction a distance in excess of the stitch length, a channel guide movable toward and from the work and laterally a stitch length, and means for actuating the parts, substantially as described.

6. A shoe sewing machine, having, in combination, a curved hook needle, a looper, a curved awl, a welt guide segment, a welt guide slide way of which the center is the axis of the needle and means for actuating the parts operating to oscillate the welt guide segment in its slide way to cause it to retract slightly from the work during the feed movement thereof and then again to engage the work during the work penetrating movement of the awl, substantially as described.

7. A shoe sewing machine, having, in combination, a curved hook needle, a looper, a curved awl, means for actuating the parts operating to cause the awl to engage, feed and penetrate the materials successively, a welt guide movable in the path of motion of the needle and means for actuating it operating to retract it slightly from the work during the feed movement of the awl and to cause it to again engage the work during the work penetrating movement of the awl, substantially as described.

8. A shoe-sewing machine having combined instrumentalities, including an awl and means for actuating the awl operating to impart to it a lateral movement of greater amplitude than the required feed movement, a part of such movement occurring while the awl is out of engagement with the work for the purpose of affording clearance for the other instrumentalities, substantially as described.

9. A shoe-sewing machine having, in combination, a curved hook needle, a looper, a thread finger, a take-up, a spring-actuated auxiliary take-up, a stop for limiting the thread-pulling action of the auxiliary take-up, and means for actuating the take-up acting to cause it to give up, during the retracting movement of the needle, enough thread to allow the auxiliary take-up to engage its stop at such time so as not to steal thread from the loop delivered by the thread finger, substantially as described.

10. A shoe sewing machine, having, in combination, a curved hook needle, a looper, a curved awl of the same radius of curvature as the needle, a reciprocating feed slide upon which the awl is pivotally supported upon the axis of the needle, and means for actuating the awl and feed slide to cause the awl to move diagonally down toward and into engagement with the work, then to move laterally a stitch length, then to retract from the work and finally to move laterally in the opposite direction a distance in excess of the stitch length, substantially as described.

11. A shoe sewing machine, having, in combination, a curved hook needle, arranged to operate from the outside of a lasted shoe and to pass through the welt, upper and between-substance of the shoe, devices including a looper coöperating with the needle to form a chain stitch, a feed slide, a curved awl mounted thereon concentric with the needle and arranged to enter the channel of the sole of a shoe and move with the feed slide with relation to the needle to feed the work, an oscillatory welt guide, a welt guide slide operating in a plane at right angles to the axis of the needle, a spring to advance the welt guide slide, a cam actuated lever to retract the welt guide slide, and connections between the welt guide slide and the welt guide acting to transmit the movements of the slide in both directions to the welt guide to move the welt guide toward and from the shoe.

In testimony whereof I affix my signature, in presence of two witnesses.

ANDREW EPPLER.

Witnesses:
FARNUM F. DORSEY,
HORACE VAN EVEREN.